United States Patent
Pettersson

(10) Patent No.: US 7,986,946 B2
(45) Date of Patent: Jul. 26, 2011

(54) EVALUATION OF RANDOM ACCESS PREAMBLE CODES

(75) Inventor: Jan Pettersson, Sundbyberg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 753 days.

(21) Appl. No.: 11/993,985

(22) PCT Filed: Jun. 29, 2005

(86) PCT No.: PCT/SE2005/001066
§ 371 (c)(1),
(2), (4) Date: Dec. 27, 2007

(87) PCT Pub. No.: WO2007/001222
PCT Pub. Date: Jan. 4, 2007

(65) Prior Publication Data
US 2008/0207196 A1      Aug. 28, 2008

(51) Int. Cl.
*H04W 4/00* (2009.01)

(52) U.S. Cl. ........ 455/424; 370/335; 370/241; 370/342; 370/465; 370/441; 375/130

(58) Field of Classification Search .................. 455/424; 370/241, 335, 342, 465, 441; 375/130
See application file for complete search history.

(56) References Cited

U.S. PATENT DOCUMENTS

| | | | |
|---|---|---|---|
| 2001/0017881 A1* | 8/2001 | Bhatoolaul et al. | 375/130 |
| 2004/0137850 A1 | 7/2004 | Lucidarme et al. | |
| 2005/0047347 A1* | 3/2005 | Lee et al. | 370/241 |
| 2005/0047530 A1 | 3/2005 | Lee et al. | |
| 2005/0117675 A1 | 6/2005 | Das et al. | |
| 2005/0232158 A1* | 10/2005 | Hondo | 370/241 |
| 2006/0126573 A1* | 6/2006 | Dick et al. | 370/335 |

FOREIGN PATENT DOCUMENTS

EP     1 109 326 A1     6/2001

OTHER PUBLICATIONS

3GPP. 3rd Generation Partnership Project: Technical Specification Group Radio Access Network; UTRAN $I_{ub}$ Interface User plane Protocols for Common Transport Channel Data Streams (Release 6). TS 25.435 v6.2.0 Jun. 24, 2005.
3GPP. 3rd Generation Partnership Project: Technical Specification Group Radio Access Network; UTRAN $I_{ub}$ Interface Node B Application part (NBAP) Signalling (Release 6). TS 25.433 v6.6 0 Jun. 24, 2005.

* cited by examiner

*Primary Examiner* — Pierre-Louis Desir

(57) ABSTRACT

The present invention relates to methods and arrangements for gathering statistics relating to random access operation in a cell of a cellular radio communication network and supervising such random access operation. Statistics are gathered (301), per random access preamble code, relating to random access detections associated with one or more random access preamble codes used in the cell. Based on such gathered statistics, random access operation in the cell may be supervised by evaluating (311) the gathered statistics and, upon determining (312) that the random access detections associated with a specific random access preamble code exhibit an abnormal behaviour likely to be caused by false random access preamble detections, initiating (313) at least one of issuing a corresponding operation and maintenance alarm signal and automatically blocking further use of said specific random access preamble code in the cell.

25 Claims, 5 Drawing Sheets

GATHER STATISTICS PER PREAMBLE CODE RELATING TO RANDOM ACCESS DETECTIONS ASSOCIATED WITH ONE OR MORE PREAMBLE CODES USED IN THE CELL ~301

Fig. 3A

EVALUATE STATISTICS RELATING TO RANDOM ACCESS DETECTIONS ASSOCIATED WITH ONE OR MORE RANDOM ACCESS PREAMBLE CODES — 311

ABNORMAL BEHAVIOUR FOUND FOR PREAMBLE CODE AT STEP 311? ~312

NO / YES

INITIATE AT LEAST ONE OF ISSUING AN O&M ALARM AND AUTOMATICALLY BLOCKING FURTHER USE OF PREAMBLE CODE ~313

Fig. 3B

EVALUATION OF RANDOM ACCESS PREAMBLE CODES

TECHNICAL FIELD OF THE INVENTION

The invention relates to random access operation in a cellular radio communication network. More in particular the invention relates to methods and arrangements for gathering statistics and supervising random access operation in the cellular radio communication network.

DESCRIPTION OF RELATED ART

In cellular radio communication systems, such as the Universal Mobile Telecommunication Systems (UMTS) specified by the $3^{rd}$ Generation Partnership Project (3GPP), mobile stations gain initial access to radio channel resources by performing a random access procedure.

A mobile station (alternatively referred to as User Equipment) operating in a cell of a WCDMA cellular system (i.e. an UMTS system operating in FDD mode) initiates random access on a random access channel (RACH) by transmitting random access preambles at increasing power. When a base station serving the cell detects a valid random access preamble, it responds by transmitting an acquisition indication signal to the mobile station on an acquisition indication channel (AICH) and the mobile station then transmits its random access message to the base station on the random access channel.

A plurality of random access preamble codes are configured for use in the cell. When performing a random access, a mobile station selects one of said plurality of random access preamble codes for use when performing the random access.

When defining random access preamble detection thresholds in cells, a tradeoff is made between sensitivity (cell coverage) and robustness against false random access preamble detections caused by different kinds of disturbances.

The inventor of the present invention has recognized that different random access preamble codes, i.e. different random access preamble patterns, may exhibit different degrees of robustness against false random access preamble detections.

SUMMARY OF THE INVENTION

The problem dealt with by the present invention is to provide conditions for improving random access operation in a cellular radio communication network.

The problem is solved essentially by a method of gathering statistics, on a per random access preamble code basis, and a method for supervising random access operation in a cell of the cellular radio communication network utilizing said gathered statistics. The invention also includes apparatuses and software implementing said methods, as well as a radio communication network including such apparatuses.

One advantage afforded by the invention is that it provides increased knowledge of the random access performance in a cell which can serve as a basis for improving the random access operation in the cell.

A more specific advantage of the invention is that it enables identification of random access preamble codes for which false random access preamble detection often occurs in a cell and allows corrective measures to be taken in order to improve the random access operation.

A further advantage of preferred embodiments of the invention, is that the risk for false random access preamble detections may be reduced in a way that does not require a decrease of the sensitivity of the preamble detector.

The invention will now be described in more detail with reference to exemplary embodiments thereof and also with reference to the accompanying drawings.

BRIEF DESCRIPTION OF THE DRAWINGS

FIG. 3A is a flow diagram illustrating a basic method for gathering statistics according to the invention.

FIG. 3B is a flow diagram illustrating a basic method according to the invention for supervising random access operation.

DETAILED DESCRIPTION OF THE EMBODIMENTS

Figure 1:
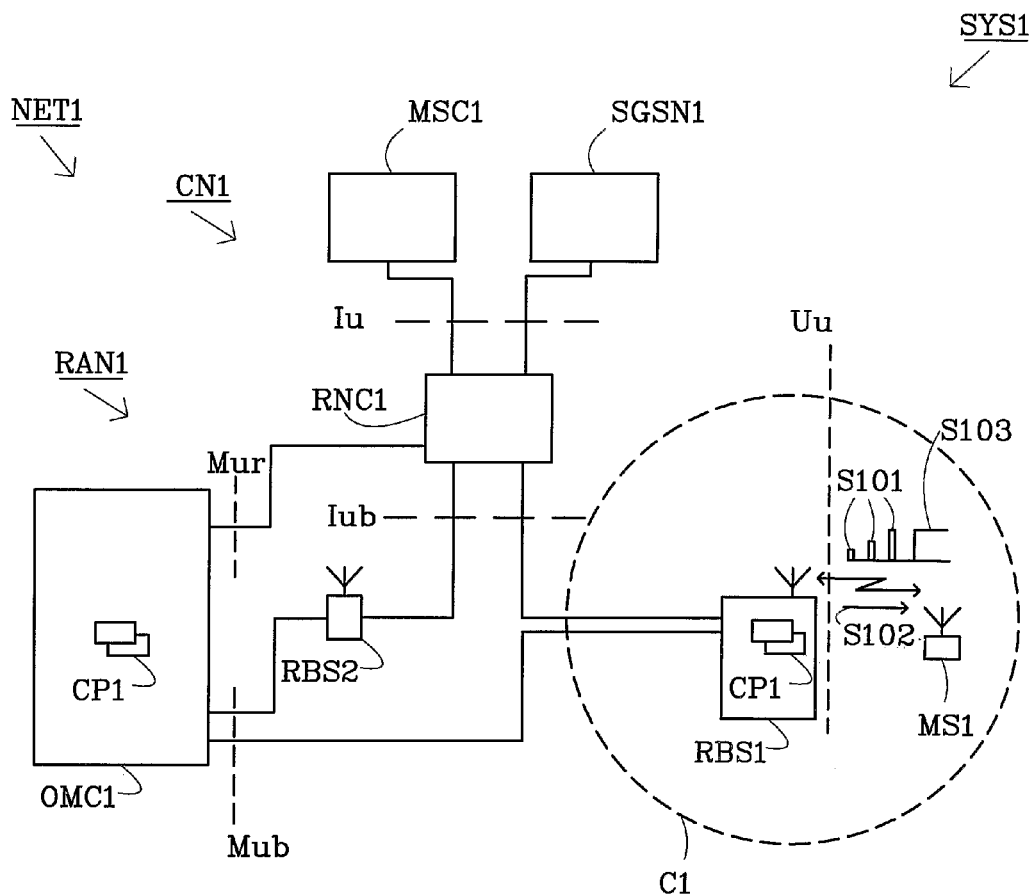
FIG. 1 is a schematic view of an example mobile communication system in which the present invention may be advantageously employed.

FIG. 1 illustrates a non-limiting example of a communication system SYS1 in which the present invention may be employed. The exemplary communication system SYS1 illustrated in FIG. 1 is a Universal Mobile Telecommunication System (UMTS). The communication system SYS1 includes a cellular radio communication network NET1 and User Equipment (UE), alternatively referred to as mobile stations (MS). The cellular radio communication network NET1 includes a core network CN1 and a UMTS Terrestrial Radio Access Network (UTRAN) RAN1

The core network CN1 includes a Mobile services Switching Center (MSC) node MSC1 that provides circuit-switched services and a General Packet Radio Service (GPRS) node SGSN1, sometimes referred to as a Serving GPRS Support node (SGSN), which is tailored to provide packet-switched type services.

Each of the core network nodes MSC1 and SGSN1 connects to the the radio access network RAN1 over a radio access network interface referred to as the Iu interface. The radio access network RAN1 includes one or more radio network controllers (RNCs). For sake of simplicity, the radio access network RAN1 of FIG. 1 is shown with only one radio network controller node RNC1. Each radio network controller is connected to and controls a plurality of radio base stations (RBSs). For example, and again for sake of simplicity, FIG. 1 only illustrates a first radio base station node RBS1 and a second radio base station node RBS2 connected to the radio network controller node RNC1. The interface between the radio network controller RNC1 and the base stations RBS1 and RBS2 is referred to as the Iub interface.

Mobile stations, such as mobile station MS1 shown in FIG. 1, communicate with one or more radio base stations RBS1-RBS2 over a radio or air interface referred to as the Uu interface.

For operation and maintenance tasks, such as configuration, performance and fault management of the radio access network RAN1, a Operation and Maintenance Centre node OMC1 is included in the radio access network. The Operation and Maintenance Centre node OMC1 interacts with the radio base stations RBS1 and RBS2 via an interface referred to as Mub while interactions with the radio network controller RNC1 occurs via an interface referred to as Mur.

Each of the radio interface Uu, the Iu interface, the Iub interface, the Mub interface and the Mur interface are shown by dashed lines in FIG. 1.

When a mobile station, such as mobile station MS1, initiates a random access in a cell, such as cell C1 served by the first radio base station RBS1, the mobile station MS1 transmits random access preambles S101 at increasing power on a random access channel (RACH). When the radio base station RBS1 serving the cell C1 detects a valid random access preamble, it responds by transmitting a positive acquisition indication signal S102 to the mobile station MS1 on an acquisition indication channel (AICH) and the mobile station MS1 then transmits its random access message S103 to the radio base station BS1 on the random access channel.

Figure 7:
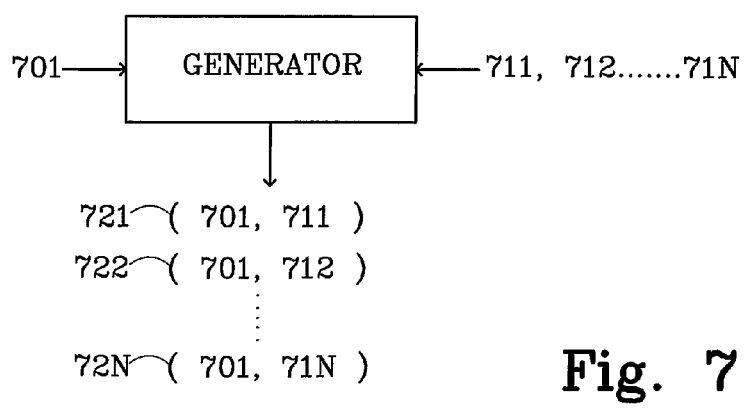
FIG. 7 is a schematic block diagram illustrating generation of a set of random access preamble codes from a preamble scrambling code and plural preamble signatures.

A plurality of random access preamble codes are configured for for use in the cell C1. Each random access preamble code is defined by a preamble scrambling code and a preamble signature. Typically one (sometimes more) preamble scrambling codes and a plurality of associated preamble signatures are configured for use in the cell C1. FIG. 7 schematically illustrates how a set of N random access preamble codes 721-72N are defined by a preamble scrambling code 701 and N preamble signatures 711-71N associated with said preamble scrambling code 701.

The mobile stations operating in the cell C1 are informed of the available preamble scrambling codes and associated plurality of preamble signatures via system information signals transmitted on the downlink broadcast channel (BCH) of the cell C1. When a mobile station, such as mobile station MS1, initiates a random access, the mobile station selects a particular combination of random access preamble scrambling code and preamble signature and hence the mobile station selects one of said plurality of random access preamble codes for use when performing the random access. In a cell where a single preamble scrambling code is available, the selection of a random access preamble code is effected by a mobile station randomly selecting a preamble signature which together with said single preamble scrambling code available in the cell defines the selected random access preamble code.

Figure 2:
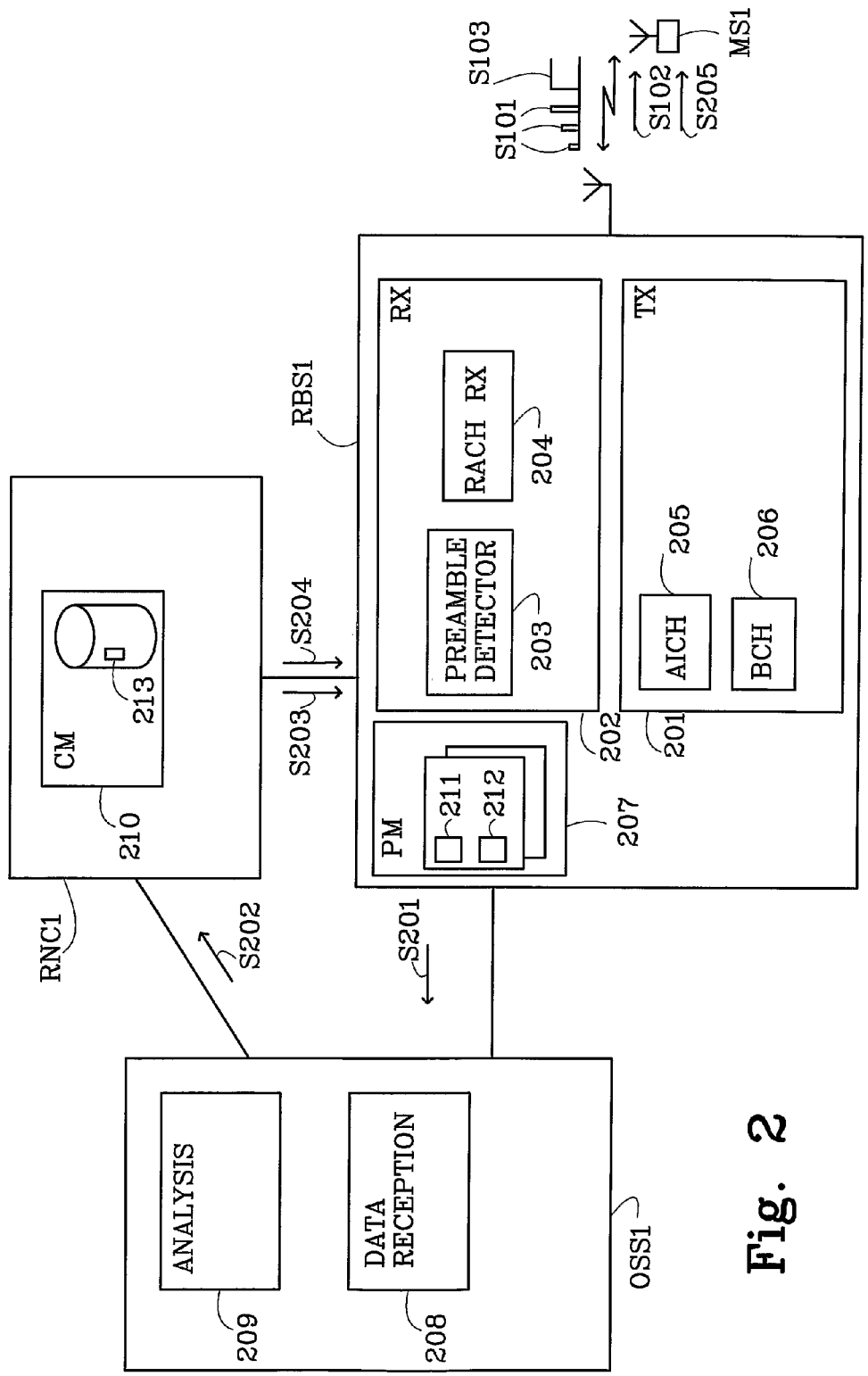
FIG. 2 is a schematic block diagram of functional blocks in some nodes of the communication system in FIG. 1

FIG. 2 is a schematic block diagram illustrating functional blocks of the radio network controller RNC1, radio base station RBS1 and operation and maintenance centre OMC1 of particular relevance when discussing the present invention.

The radio base station RBS1 includes a transmitter function block 201 and a receiver function block 202.

The receiver function block 202 includes a preamble detector subblock 203 for detecting random access preambles and a random access receiver subblock 204 for demodulating and decoding the random access messages.

The transmitter function block 201 includes an Acquisition Indicator Channel (AICH) subblock 205 for transmission of Acquisition indicator signals and a Broadcast Control Channel (BCH) subblock 206 for transmission of system information in the cell.

The preamble detector 203 is configured to continuously try and detect possible random access preambles sent by mobile stations operating in the cell C1. Thus the preamble detector 203 correlates received input signal with the different random access preamble codes configured for use in the cell C1. If the power detected for one of said random access preamble codes exceeds a random access preamble detection threshold defined for the cell C1, a random access preamble detection has occurred. Once a random access preamble has been detected, the AICH subblock 205 is triggered to transmit a corresponding positive acquisition indicator signal. The random access receiver 204 is also requested to provide resources for decoding and demodulating a random access message following the detected random access preamble.

Upon receipt of the acquisition indicator signal S102 by a mobile station e.g. mobile station MS1, currently performing random access in the cell C1 using a random access preamble code corresponding to said transmitted acquisition indicator signal S102, the mobile station MS1 transmits the random access message S103 which upon receipt by the radio base station RBS1 is demodulated and decoded by the random access receiver 204. The results of attempting to decode the random access message, regardless of whether the decoding succeeded or not, is forwarded from the radio base station RBS1 to the radio network controller RNC1 using the RACH Frame protocol of 3GPP TS 25.435.

When defining a random access preamble detection threshold for use in the cell C1, a tradeoff is made between sensitivity (cell coverage) and robustness against false random access preamble detections caused by different kinds of disturbances.

The inventor of the present invention has recognized that different random access preamble codes, i.e. different random access preamble patterns, exhibit different degrees of robustness against disturbances. One example of such disturbances would be the presence of a DC offset in a base band signal input to the preamble detector 203 in the radio base station RBS1. Such a DC offset could be the result of e.g.

1. Strong correlated signals on both receiver branches caused by e.g. a high traffic load on the uplink of the cell C1, the cell C1 being an indoor cell and the radio base station RBS1 having interconnected antenna branches or a repeater in line of sight with the base station antennas.
2. A high DC offset (carrier leakage) in a mobile station.
3. A hardware error in the radio base station RBS1.

The impact of such a disturbance depends on the intensity of the false preamble detection rate. The impact goes from none up to inaccessible cells. In between it may cause high delays and failed call setups, bad accessibility, long channel switching times, and overloaded RACH receivers.

The present invention addresses the situation elaborated above.

FIG. 3A illustrates a basic method according to the invention of gathering statistics relating to detected random accesses in a cell of a cellular radio communication network, wherein a random access includes transmission of a random access preamble code selected among a plurality of random access preamble codes used in the cell.

At step 301 statistics is gathered, per random access preamble code, relating to random access detections associated with one or more random access preamble codes used in the cell.

FIG. 3B illustrates a basic method according to the invention for supervising random access operation in a cell of a cellular radio communication network, wherein a random access includes transmission of a random access preamble code selected among a plurality of random access preamble codes configured for use in the cell.

At step 311 statistics relating to random access detections associated with one or more random access preamble codes used in the cell are evaluated;

Upon determining in said evaluation step 311 that the random access detections associated with a specific random access preamble code exhibit an abnormal behaviour likely to be caused by false random access preamble detections (an alternative YES at step 312), at least one of issuing a corresponding operation and maintenance alarm signal and automatically blocking further use of said specific random access preamble code in the cell are initiated at step 313.

Figure 4A:
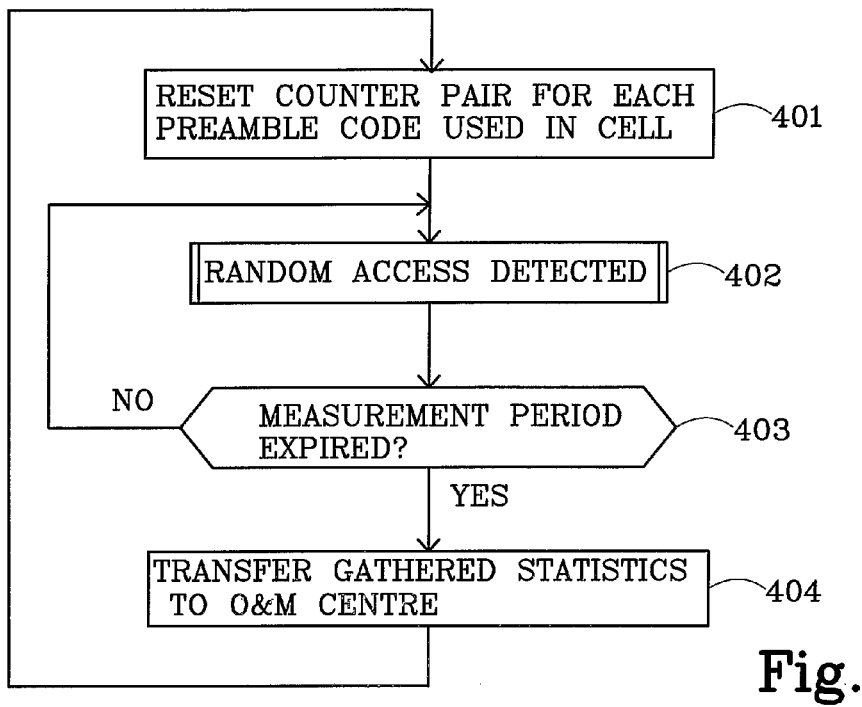
FIG. 4A-B are flow diagrams illustrating processing for implementing a first exemplary embodiment of the invention for gathering statistics.
Figure 4B:
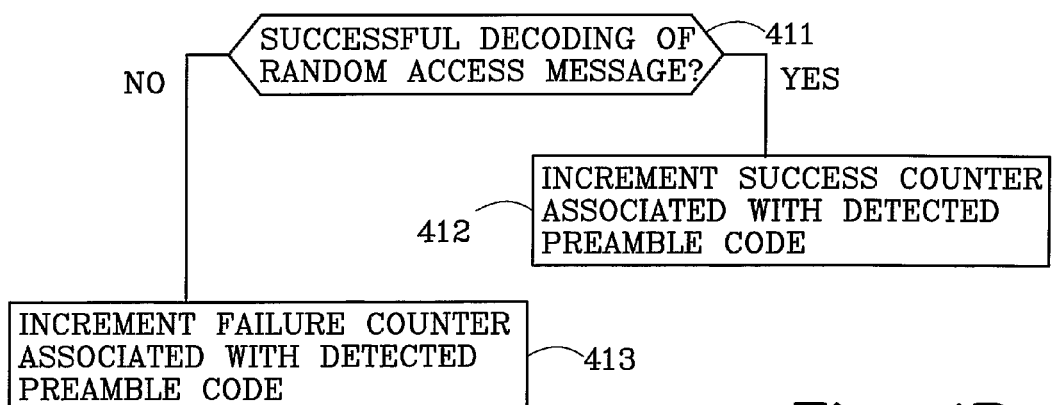

FIG. 4A-4B are flow charts illustrating processing in the radio base station RBS1 for implementing an exemplary first embodiment of the invention for gathering statistics related to random accesses in the cell C1 of FIG. 1. The processing of FIG. 4A-4B is performed by the performance management (PM) functional block of FIG. 2.

In this embodiment, two counters are associated with each random access preamble code configured for use in the cell C1. A success counter 211 is used to count all occurrences of successful decoding of a random access message part following detection of a random access preamble using the associated random access preamble code. A failure counter 212 is used to count all occurrences of unsuccessful decoding of a random access message part following detection of a random access preamble using the associated random access preamble code.

At step 401 in FIG. 4 a measurement period is intiated by resetting the counter pairs 211-212 for each random access preamble code used in the cell C1.

When detecting a random access, the counters 211-212 associated with the random access preamble code for which a random access was detected is updated according to FIG. 4B. The performance management block 207 is informed when detection of a random access preamble occurs and the results (success or failure) of decoding the associated random access message part by the RACH receiver 204

At step 411 in FIG. 4B a check is made whether successful decoding of a random access message part has occurred. If successful detection has occurred (an alternative YES at step 411), the success counter 211 associated with the random access preamble code for which a random access preamble was detected is incremented by one. Otherwise (an alternative NO at step 411), the corresponding failure counter 212 associated with said random access preamble code is incremented by one.

If the measurement period has not expired (an alternative NO at step 403), the processing of step 402 is repeatedly performed for each random access detection occurring during the measurement period. When the measurement period has expired (an alternative YES at step 403), the gathered statistics, i.e. the values of the success and failure counters 211-212 associated with each of the random access preamble codes used in the cell C1, is transferred to the operation and maintenance centre OMC1 using ftp (file transfer protocol). A new measurement period is automatically initiated and processing therefore continues at step 401.

Figure 5:
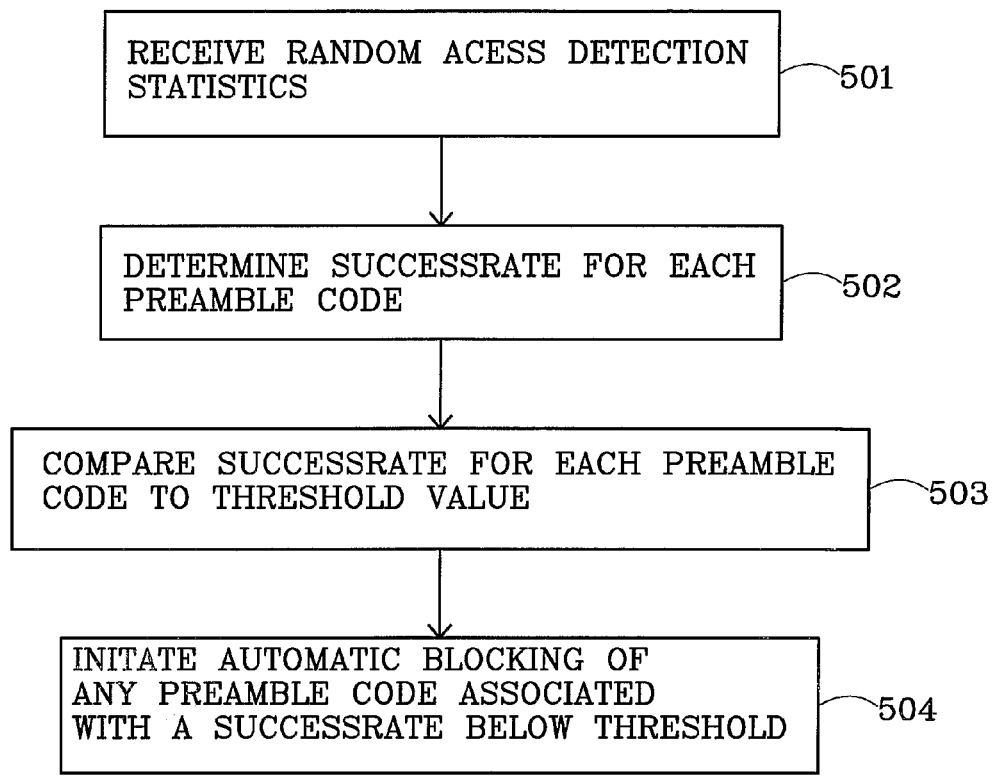
FIG. 5 is a flow diagram illustrating processing for implementing a first exemplary embodiment of the invention for supervising random access operation.

FIG. 5 is a flow chart illustrating processing in the radio base station for implementing an exemplary first embodiment of the invention for supervising random access operation in the cell C1 of FIG. 1. The steps of FIG. 5 are performed by a data reception block 208 and an analysis block 209 of the operation maintenance centre OMC1 (see FIG. 2).

At step 501 random access detection statistics are received from the radio base station RBS1 in a signal (file transfer) S201 over the Mub interface by the data reception block 208.

At step 502, the analysis block 209 determines random access success rates by dividing the value of the success counter 211 with the sum of the success and failure counters 211-212 for each random access preamble code for which random access detection statistics were received at step 501.

At step 503, the analysis block 209 compares each of the success rates determined at step 502 to a threshold value which may e.g. be set as 50% of the highest success rate determined at step 502. If the success rate associated with a random access preamble code is found to be below the threshold value, the random access detections associated with said random access preamble code is considered as exhibiting an abnormal behaviour likely to be caused by false random access detections.

At step 504, automatic blocking from further use in cell C1 of any random access preamble code associated with a success rate below the threshold value is initiated by the analysis block 209. Since a random access preamble code in an UMTS system is defined by a combination of preamble scrambling code and preamble signature, blocking of a specific random access preamble code involves blocking the corresponding combination of preamble scrambling code and preamble signature. In this embodiment, blocking of a specific random access preamble code is effected by blocking further use of the specific preamble, signature in combination with the specific preamble scrambling code (often there may be only a single preamble scramble code configured for use in a cell).

Thus at step 504, for any specific random access preamble code associated with a success rate which at step 503 was found to be below the threshold value, a reconfiguration of the cell C1 is intiated in order to block further use of the corresponding preamble signature in combination with the corresponding preamble scrambling code in the cell C1. Thus the analysis block trigger transmission of a reconfiguration order signal S202 from the operation and maintenance centre OMC1 to the radio network controller RNC1 over the Mur interface.

Upon receipt of the reconfiguration order signal S202 in the radio network controller RNC1, a configuration management block 210 changes the attributes for the managed object 213 representing the cell C1 so that the random access preamble codes being blocked from further use in the cell C1 no longer are valid for use in the cell C1. The radio network controller RNC1 informs the radio base station RBS1 of the changed configuration of cell C1 via a 3GPP TS 25.433 System Information Update Request signal S203 and a 3GPP TS 25.433 Common Transport Channel Reconfiguration Request signal S204 over the Iub interface.

In response to receiving the System Information Update Request signal S203 in the radio base station RBS1, the BCH subblock 206 modifies the system information messages S205 transmitted on the Broadcast Control Channel of cell C1 to reflect that the combinations of random access preamble scrambling codes and preamble signatures corresponding to blocked random access preamble codes are no longer valid for cell C1.

In response to receiving the Common Transport Channel Reconfiguration Request signal S204 in the radio base station RBS1, the Preamble Detector 203 ceases to detect random access preambles using the blocked random access preamble codes.

In the first exemplary embodiments of the invention, one or more control processors CP1 in the radio base station RBS1 are programmed to implement the performance management functional block 205 of FIG. 2 and thus performs the processing associated with the method illustrated in FIG. 4A-4B. Thus the radio base station RBS1 can be regarded as an apparatus for performing the method of FIGS. 4A-4B and the control processors CP1 functions as means for performing the different method steps. In a similar way one or more control processors CP1 in the operation and maintenance centre OMC1 are programmed to implement the data reception and analysis functional blocks 208-209 and thus performs the processing illustrated in FIG. 5. Thus the operation and maintenance centre OMC1 can be regarded as an apparatus for performing the method of FIG. 5 and the control processors CP1 functions as means for performing the different method steps.

Apart from the exemplary first embodiments of the invention disclosed above, there are several ways of providing rearrangements, modifications and substitutions of the first embodiments resulting in additional embodiments of the invention.

There are several alternatives for how statistics relating to random access detections associated with different random access preamble codes are gathered. Typically said statistics gathering includes registering, per random access preamble code, at least one of detected random access preambles and random access failures associated with one or more random access preamble codes. Thus one or more counters could be associated with each of said one or more random access preamble codes for which statistics are gathered. There could e.g. be one success counter and one failure counter per random access preamble code, only a failure counter counting the number of instances where random access message decoding failed following random access preamble detection associated with the random access preamble code, only a counter counting the number of random access preamble detections associated with the random access preamble code, a success counter and a counter counting the number of random access preamble detections associated with the random access preamble code etc. Instead of incrementing counter variables, it would also be possible to continuously update e.g. a success ratio variable per random access preamble code or alternatively generate success ratio values at the end of a measurement period and provide such success ratio values as output from the statistics gathering step.

Preferably statistics is gathered for each random access preamble code used in the cell. However, gathering statistics for a subset of one or more of the random access preamble codes used in a cell would also provide increased knowledge of the random access operation performance in the cell. In particular, if based on previous experience or simulation results, a subset of one or more random access preamble codes are considered (based on e.g. previous experience or simulation results) less robust against certain disturbances than other random access preamble codes used in the cell, statistics gathering could be performed for only said subset of random access preamble codes.

In a cell of a UMTS network where a single preamble scrambling code is used, gathering of statistics per random access preamble code may be achieved by gathering statistics per preamble signature.

When evaluating gathered statistics for determining whether the random access detections associated with a specific random access preamble code exhibit an abnormal behavior likely to be caused by false random access detections, a multitude of different criteria can be employed. Typically such criteria would be expressed as one or more threshold values and said evaluation would include evaluating the gathered statistics against said threshold value. Examples of threshold values could e.g. be a minimum success ratio, a maximum number of random access detections or a maximum number of failed random access message decoding attempts in a measurement period or per time unit. The threshold values can be fixed values or defined in relation to statistics gathered for the current measurement period so as to adapt the threshold value to a current system load and interference situation. The criteria employed may also be a composite criteria e.g. requiring that the current random access detection load is above e.g. 10 detections/second and a failure rate above 50% in order to consider the random access behaviour abnormal.

Instead of initiating automatic blocking of random access preamble codes exhibiting abnormal behaviour, issuing of a corresponding operation and maintenance alarm signal may be initiated to alert operation and maintenance personnel of the situation. Yet another alternative would be to initiate both automatic blocking of said random access preamble codes and issuing of a operation and maintenance alarm signal.

A limit may be specified for the maximum number of random access preamble codes in a cell that may be automatically blocked in response to detecting abnormal random access behaviour. In embodiments employing such a limit, automatic blocking is preferably initiated for those random access preamble codes associated with the worst random access behaviour up to the defined maximum number of random access preamble codes that may be automatically blocked.

In the exemplary first embodiments of the invention disclosed above, the operation and maintenance center OMC1 periodically (e.g. each 15 minutes) retrieves and evaluates statistics gathered by the radio base station RBS1. Thus, in a worst case scenario there my be a delay of up to 15 minutes from the moment that a disturbance causing a high rate of false random access preamble detections occurs until the operation and maintenance center OMC1 initiates automatic blocking and/or an operation and maintenance alarm signal. In order to reduce this delay, the random access performance associated with different random access preamble codes may also be supervised in the radio base station RBS1. In an exemplary embodiment, such supervision could be implemented by having the random access receiver subblock 204 initiate evaluation of the gathered statistics associated with the different random access preamble codes upon detecting an extremely high load situation (lack of resources for performing random access message decoding). If, based on the statistics gathered so far in a current measurement period by the success and failure counters, a first subset of one or more random access preamble codes exhibits an extremely high percentage (e.g. more than 90%) of failed random accesses while other random access preamble codes exhibits significantly less random access failures, the preamble detector 203 may immediately block further random access preamble detections for said subset of random access preamble codes for the remainder of the current measurement period in order to avoid a situation where false random access preamble detections prevents detection of true random accesses due to a lack of resources. Preferably, or as an alternative to automatically blocking further random access preamble detections using said subset of random access preamble codes, the radio base station RBS1 may also immediately issue an operation and maintenance alarm signal to the operation and maintenance centre OMC1 in order to alert operation and maintenance personnel of the situation.

As an alternative to gathering statistics per random access preamble code in the radio base station RBS1, such statistics could be gathered in the radio network controller RNC1. However, this would require that the RACH Frame protocol of 3GPP TS 25.435 is modified to include information reflecting the random access preamble code associated with a particular instance of random access detection.

Figure 6:
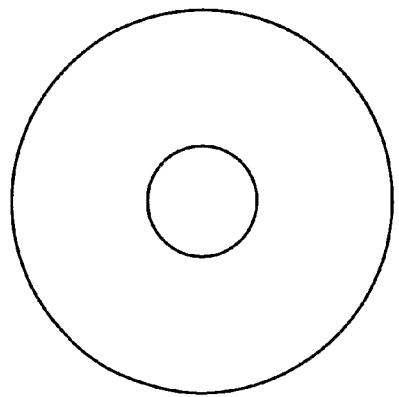
FIG. 6 shows an example of a computer-readable medium

In the first exemplary embodiments of the invention disclosed above, digital data processing circuitry in the form of one or more conventional programmable processors are used to perform the different processing steps of the methods. However, any digital data processing circuitry capable of performing said processing could be used, e.g. an ASIC, a discrete logic circuit etc. In the first exemplary embodiments of the invention, as in other embodiments of the invention using programmable devices, the controlling computer program (software) is embodied as machine-readable instructions stored on some kind of computer-readable medium such as RAM, a hard drive, electronic read-only memory, an optical storage device (e.g. a CD-ROM as schematically illustrated in FIG. 6) etc. Programmable devices performing processing according to the invention, can be dedicated to this task or used also for processing relating to other tasks.

Even though the invention in its first exemplary embodiment has been applied to a UMTS cellular radio communication network, the invention may of course be applied in other cellular radio communication networks wherein random access includes transmission of random access preamble codes selected among a plurality of such codes available in a cell.

The invention claimed is:

1. A method implemented by an apparatus for gathering statistics relating to detected random accesses in a cell of a cellular radio communication network, wherein a random access includes transmission of a random access preamble code selected among a plurality of random access preamble codes used in the cell, said method including the step of:
   gathering statistics, per random access preamble code, relating to random access detections associated with one or more random access preamble codes used in the cell;
   wherein each random access preamble code is defined by a combination of a preamble scrambling code and a preamble signature and wherein at least one preamble scrambling code and a plurality of preamble signatures associated with each of said at least one preamble scrambling code are configured for use in the cell; and
   wherein said statistics gathering step includes registering, per random access preamble code, at least one of detected random access preambles and random access failures associated with said one or more random access preamble codes.

2. The method according to claim 1, wherein said statistics gathering step includes gathering statistics relating to random access detections for plural random access preamble codes used in the cell.

3. The method according to claim 1, wherein said statistics gathering step includes gathering statistics relating to random access detections for each random access preamble code used in the cell.

4. A method implemented by a first node of a cellular radio communication network for supervising random access operation in a cell of the cellular radio communication network, wherein a random access includes transmission of a random access preamble code selected among a plurality of random access preamble codes used in the cell, said method including the steps of:
   evaluating statistics relating to random access detections associated with one or more random access preamble codes used in the cell;
   upon determining in said evaluation step that the random access detections associated with a specific random access preamble code exhibit an abnormal behaviour likely to be caused by false random access preamble detections, initiating at least one of issuing a corresponding operation and maintenance alarm signal and automatically blocking further use of said specific random access preamble code in the cell;
   wherein said evaluation includes evaluating the gathered statistics against a threshold value; and
   wherein said threshold value defines a maximum number of random access detections in a measurement period and the random access detections associated with a specific random access preamble code is considered abnormal if the gathered statistics for said specific random access preamble code indicates a number of random access detections above said threshold value.

5. The method according to claim 4, wherein said statistics are gathered according to following step: gathering statistic, per random access preamble code, relating to random access detections associated with one or more random access preamble codes used in the cell.

6. An apparatus in a cellular radio communication network for gathering statistics relating to detected random accesses in a cell of the cellular radio communication network, wherein a random access includes transmission of a random access preamble code selected among a plurality of random access preamble codes used in the cell, said apparatus including:
   digital data processing circuitry adapted to gather statistics, per random access preamble code, relating to random access detections associated with one or more random access preamble codes used in the cell;
   wherein each random access preamble codes is defined by a combination of a preamble scrambling code and a preamble signature and wherein at least one preamble scrambling code and a plurality of preamble signatures associated with each of said at least one preamble scrambling code are configured for use in the cell; and
   wherein said digital data processing circuitry are adapted to register, per random access preamble code, at least one of detected random access preambles and random access failures associated with said one or more random access preamble codes.

7. The apparatus according to claim 6, wherein statistics relating to random access detections for plural random access preamble codes used in the cell are gathered.

8. The apparatus according to claim 6, wherein statistics relating to random access detections for each random access preamble code used in the cell are gathered.

9. An apparatus in a cellular radio communication network for supervising random access operation in a cell of the cellular radio communication network, wherein a random access includes transmission of a random access preamble code selected among a plurality of random access preamble codes used in the cell, said apparatus including:
   digital data processing circuitry adapted to evaluate statistics relating to random access detections associated with one or more random access preamble codes used in the cell and upon determining that the random access detections associated with a specific random access preamble code exhibit an abnormal behaviour likely to be caused by false random access preamble detections, initiating at least one of issuing a corresponding operation and maintenance alarm signal and automatically blocking further use of said specific random access preamble code in the cell;
   wherein said evaluation includes evaluating the gathered statistics against a threshold value; and
   wherein said threshold value defines a maximum number of random access detections in a measurement period and the random access detections associated with a specific random access preamble code is considered abnormal if the gathered statistics for said specific random access preamble code indicates a number of random access detections above said threshold value.

10. A method implemented by an apparatus for gathering statistics relating to detected random accesses in a cell of a cellular radio communication network, wherein a random access includes transmission of a random access preamble code selected among a plurality of random access preamble codes used in the cell, said method comprising the steps of:
gathering statistics, per random access preamble code, relating to random access detections associated with one or more random access preamble codes used in the cell; and
evaluating the gathered statistics to determine whether the random access detections associated with a specific random access preamble code exhibit an abnormal behavior likely to be caused by false random access preamble detections, wherein each random access preamble code is defined by a combination of a preamble scrambling code and a preamble signature and wherein at least one preamble scrambling code and a plurality of preamble signatures associated with each of said at least one preamble scrambling code are configured for use in the cell.

11. The method according to claim 10, wherein upon said determining, initiating at least one of issuing a corresponding operation and maintenance alarm signal and automatically blocking further use of said specific random access preamble code in the cell.

12. The method according to claim 11, wherein the method includes receiving said statistics in a signal from another node of the cellular radio communication network.

13. The method according to claim 11, wherein said statistics are gathered in the first node.

14. The method according to claim 11, wherein said evaluation step is applied for each random access preamble code for which corresponding statistics is available.

15. The method according to claim 11, wherein said evaluation includes evaluating the gathered statistics against a threshold value.

16. The method according to claim 15, wherein said threshold value defines a success ratio and the random access detections associated with a specific random access preamble code is considered abnormal if the gathered statistics for said specific random access preamble codes indicates a success ratio below said threshold value.

17. The method according to claim 15, wherein said threshold value defines a maximum number of random access detections in a measurement period and the random access detections associated with a specific random access preamble code is considered abnormal if the gathered statistics for said specific random access preamble code indicates a number of random access detections above said threshold value.

18. An apparatus in a cellular radio communication network for gathering statistics relating to detected random accesses in a cell of the cellular radio communication network, wherein a random access includes transmission of a random access preamble code selected among a plurality of random access preamble codes used in the cell, said apparatus including:
digital data processing circuitry adapted to:
gather statistics, per random access preamble code, relating to random access detections associated with one or more random access preamble codes used in the cell; and
evaluate the gathered statistics to determine whether the random access detections associated with a specific random access preamble code exhibit an abnormal behavior likely to be caused by false random access preamble detections, wherein each random access preamble code is defined by a combination of a preamble scrambling code and a preamble signature and wherein at least one preamble scrambling code and a plurality of preamble signatures associated with each of said at least one preamble scrambling code are configured for use in the cell.

19. The apparatus according to claim 18, wherein upon said determining, initiating at least one of issuing a corresponding operation and maintenance alarm signal and automatically blocking further use of said specific random access preamble code in the cell.

20. The apparatus according to claim 19, wherein said apparatus includes a data receiver for receiving said statistics in a signal from another node of the cellular radio communication network.

21. The apparatus according to claim 19, wherein said apparatus includes digital data processing circuitry for gathering said statistics.

22. The apparatus according to claim 19, wherein said evaluation is applied for each random access preamble code for which corresponding statistics is available.

23. The apparatus according to claim 19, wherein said evaluation includes evaluating the gathered statistics against a threshold value.

24. The apparatus according to claim 23, wherein said threshold value defines a success ratio and the random access detections associated with a specific random access preamble code is considered abnormal if the gathered statistics for said specific random access preamble codes indicates a success ratio below said threshold value.

25. The apparatus according to claim 23, wherein said threshold value defines a maximum number of random access detections in a measurement period and the random access detections associated with a specific random access preamble code is considered abnormal if the gathered statistics for said specific random access preamble code indicates a number of random access detections above said threshold value.

* * * * *